2,998,293
HIDE SOAKING BACTERICIDAL COMPOSITION AND PROCESS FOR USING THE SAME

Helmut Damm, Duesseldorf-Benrath, and Wilhelm Fischer, Duesseldorf, Germany, assignors to Boehme Fettchemie G.m.b.H., Duesseldorf, Germany
No Drawing. Filed Sept. 10, 1956, Ser. No. 608,688
6 Claims. (Cl. 8—94.18)

This application is a continuation-in-part of our co-pending application S.N. 317,578, filed October 29, 1952, now abandoned.

The invention relates to a hide soaking bactericidal composition comprising a slightly alkaline to substantially neutral aqueous solution containing at least about 0.0005% of actinomycin, preferably 0.001% up to 0.01% at most of actinomycin, this in admixture with from about 0.0005% up to 0.001% of another antibiotic which is specifically restricted to one or more of chloro-tetracycline, Chloromycetin, or penicillin or mixtures of these other antibiotics. The word Chloromycetin, as used in this application, is a trademark denoting chloramphenicol. The hide soaking compositions of the invention are particularly adapted as aqueous soaking baths for the soaking of furs, skins or hides in the processing of such starting materials into high quality tanned skins and leather products. The processing of these skins and hides after the removal of blood, dirt and/or preservatives as left from the skinning operation or from storage by the soaking composition of the present invention prevents excessive microbial growth and in fact inhibits proteolytically active bacteria and related microorganisms from damaging the skins and hides during the soaking operation usually carried out at ambient outside temperatures, varying from about 8–12° C. in the colder seasons and up to 30° C. in the warmer seasons of the year; for periods of time varying usually from about 3 days for salted freshly cut skins to about 10 days for heavy sundried hides.

The soaking process accomplishes the removal of water soluble proteins from the hides, these proteins going into solution in the slightly alkaline—pH 7.5 to about 8.5—aqueous soaking solution of the invention. In the absence of the admixture of at least 0.0005% preferably 0.01% of actinomycin and 0.0005 to 0.001% of chloro-tetracycline or Chloromycetin or penicillin as the other ingredient of the composition of the invention, these based on the weight of soaking solution, the water soluble proteins passing into alkaline solution furnish an ideal culture medium for proteolytic bacterial growth which during the lengthy soaking period of about up to 10 days causes serious damage to the skin.

The skin damage is due to proteolysis of the non-water soluble proteins of the skin caused by microbial growth as well as the degradation of skin substance causing a tendency to tearing in the finished product.

By increasing the pH of the bath to about 10.5 in the usual skin soaking process, the losses of protein due to higher solution in the more alkaline liquid becomes greater and the strength characteristics of the treated skin are correspondingly lessened.

By utilizing known chemical germicides, such as mercuric chloride, organic mercurials, zinc chloride, sodium arsenide, para-nitro phenol, sodium tri-chlophenate or coal tar disinfectants at the optimum pH of 7.5 to 8.5, it has been found that the relatively large concentrations of such germicidal agents required to inhibit proteolytic bacterial activity at the optimum pH for such activity, namely pH 7.5 to 8.5, results in (1) significant contamination of the finished skin or leather product with objectionable chemical germicide and (2) significant changes, probably of the nature of denaturation of proteins which deleteriously affect the desired physical properties of the finished skin product. For example, chlorometacresol used in its recommended concentration of 1:1000 represents a concentration of 0.1% as against a total concentration of the actinomycin and other antibiotic in the composition of the invention of 0.01% at most, the ratio being about 50 to 1.

Surprisingly, no characteristic odor, residue, or hardening effect is noted with the compositions of the invention as are encountered with the chemical germicides heretofore used. In concentrations which are from 50 to 200 times lower than the chemical germicides, effective soaking is provided to produce superior skin and leather products free from damage and free from objectionable odor in the soaking pit as well as in the product.

Further, in contrast to soaking procedures heretofore used which have attempted to minimize putrefaction by carrying out the process at low temperature, the compositions of the invention are equally effective at temperatures of up to about 30° C. or slightly higher.

Of the secondary antibiotics which are added to actinomycin at the above stated concentrations, chloro-tetracycline and Chloromycetin appear to work substantially in the same way insofar as their efficacy is concerned for the soaking of leather. Thus with a concentration of 0.001% of actinomycin (preferably actinomycin A although mixtures of actinomycin A and B may be used), an optimum amount of the second antibiotic Chloromycetin or chloro-tetracycline is about 0.0001 to about 0.0004%. About the same results are achieved if this amount is made up by ⅓ chloro-tetracycline, the remainder Chloromycetin or ⅓ of Chloromycetin and ⅔ chloro-tetracycline.

Using these antibiotics at less than their pharmaceutically pure state, such as in crude form, correspondingly larger amounts are employed. For example, twice as much of the 50% pure form would be employed. On this basis for dosage in accordance with the proportions found effective by the present invention, high antibiotic content cultures may be employed, but these are preferably employed as an alcohol or organic solvent solution to provide an effective concentrated dosage in the soaking solution.

The criteria for purity are manifestly not those as for medical purposes since toxicity as might be the case with actinomycin in the amounts employed for soaking hides brings no hazard to workers or to the product produced by the soaking process.

Penicillin may be used at concentrations of 0.0005% to about 0.002%, higher amounts being used when penicillin is the second ingredient than when Chloromycetin, for example, is used as the second ingredient. For short soaking periods (1–3 days) the incorporation of penicillin is preferably as a third component with a binary mixture of actinomycin in its preferred concentration and either Chloromycetin or chlorotetracycline. The three component mixture is believed optimum with penicillin when used with Chloromycetin rather than with chloro-tetracycline since only 0.0003 to 0.0005% penicillin is found to be fully effective when mixed with as little as 0.0005% of actinomycin A and 0.0005% of Chloromycetin. This last formulation represents a completely effective level of the three components which is had at minimum concentrations for each.

In the foregoing explanation of the optimum dosages for best soaking action, it is significant to note that actinomycin alone at the same concentration and in the absence of the other specified antibiotic ingredient does not function to prevent microbial damage during the soaking operation throughout the soaking period. No essential antimicrobial effect throughout the soaking time cycle is had with actinomycin per se.

Likewise, the utilization of the very slight concentrations of penicillin, chlorotetracycline or Chloromycetin, each alone, has insufficient long-time antimicrobial effect to prevent deterioration of the skin and the imparting of odor thereto by the soaking procedure required.

It is therefore surprising that the combination of these antibiotics in the extremely small proportions be so remarkably and specifically effective in the complex bacterial and chemical system defining the conditions of soaking the skins from several to 10 days.

Fatty acid sulfonates such as butyl ricinoleate sulfonate may be added in appropriate amounts to the soaking solution of the invention particularly where sun dried and hardened hides are being soaked. The detergency or wetting action of these sulfonates in a concentration of about 0.1 to 2.0 grams per liter preferably about 1.0 gram per liter of solution promotes uniform penetration of the hides by the soaking solution and prevents growth of bacteria in pockets which are mechanically withheld from the soaking solution.

In order that the process of carrying out the invention be more fully understood, the following examples are set forth in detail, by way of illustration, but not to limit the scope of the invention to the specific illustration, since it is intended not to be limited except as indicated in the claims appended to the specification.

EXAMPLE 1

Control run 1A

Sun-dried salted hides are soaked in about 400% water by weight of the hides on a reel, in one run and with about 1,000% water by weight of the hide in a pit, in another run, both runs being carried out at a temperature varying between 15–20° C. The hides are soaked through to completion after 10 days, but in each run the hides exhibit a slimy feel. The aqueous soaking liquid in each run exhibits a penetrating foul odor, indicating that development of proteolytic bacteria is very strong.

Actinomycin and chloro-tetracycline run 1B

The same soaking process as in control is carried out with the addition of a mixture of 0.001% actinomycin and 0.005% chloro-tetracycline under the same temperature 15–20° for 10 days. Substantially no bacterial growth is found at the soaking temperature of 15 to 25° C. The soaking liquid was free from odor and bacterial growth. The soaked skins were found not to be damaged in any way. The skins were worked up to a high-grade leather product of superior properties. The actinomycin is actinomycin A, pharmaceutical grade.

EXAMPLE 2

Salted skins are soaked as described in Example 1B, with the difference that 1 gram per liter of butyl ricinoleate sulfonate is added to the soaking liquid. (The sulfonate of the butyl ester of ricinoleic acid.) Not only did the soaking liquid after 10 days remain free from odor and bacterial growth but skins were worked up in this bath to give leather products of superior properties.

EXAMPLE 3

Sun-dried hides were soaked with 1000% water in a pit, but with the soaking agent of 0.0005% actinomycin and 0.001% Chloromycetin. A soaking time of three to six days was found sufficient, while preventing damage from bacteria. The lesser time was effective for thinner hides. In both cases the soaking liquid was free from odor and bacterial growth.

The same result was obtained pure, by using crude concentrates equivalent to 0.0005% actinomycin and 0.001% Chloromycetin. The following crude additions were found to be equivalent to 0.0005% of actinomycin and 0.001% of Chloromycetin:

(a) 0.1 to 0.2% of an alcoholic solution of crude actinomycin A having an antibiotic activity which corresponds to a content of 2.5 to 5.0 mg. of pure actinomycin A per cc. The alcoholic solution was obtained from the dry residue of a concentrated ethyl acetate extract of actinomycin. An amount equivalent to 0.0005% of pure actinomycin A was used in the soaking liquid.

(b) A dry residue of crude Chloromycetin, too impure for pharmaceutical purposes and having a purity of about 20–50% of the pharmaceutically pure product was used in amounts from 5 to 2 times the pure product to provide a concentration of about 0.002% of the impure product with good results and substantially no odor, slimes or bacterial growth in the soaking solution.

EXAMPLE 4

Pickled hides were soaked in the soaking liquor proportion as shown in Example 2, the wetting agent of Example 2 being used, 1 gram per liter. To the soaking solution there was added at the start of the soaking operation a mixture of the following in the proportions, based by weight on the total weight of solution:

(1) 0.001% actinomycin A.
(2) 0.0003% chlorotetracycline.
(3) 0.0001% Chloromycetin.

The solution was adjusted to pH 8.0.

The hides were sufficiently soaked after about 3 days. The soaking liquid was free from odor and slime. The skins were formed into leather products having excellent surface characteristics.

EXAMPLE 5

Pickled hides were placed in a soaking bath containing butyl ricinoleate sulfonate in an amount of 1 gram per liter, the proportions and procedure being that of Example 2, and the components added to the soaking bath consisting of (1) 0.0005% of actinomycin A.
(2) 0.0005% of penicillin.
(3) 0.0005% of Chloromycetin.

The solution was adjusted to pH 8.0. After about 3 days the skins were sufficiently soaked to be removed from the bath. No foul odors, bacterial growth or slime was seen in the soaking bath. A leather product of superior surface properties was made of the soaked hide.

Modifications may be made in carrying out the present invention without departing from the spirit and scope thereof. In the above examples, commercial mixtures of actinomycin A and B are substantially as effective as actinomycin A obtained from commercial sources. We therefore intend to be limited only by the appended claims.

What we claim is:

1. A method of soaking furs and hides after skinning in an aqueous soaking solution having a pH of 7.5 to 8.5 while preventing the development of proteolytic bacteria comprising soaking said hides in an aqueous soaking solution containing at least about 0.0005% and not more than 0.01% of actinomycin A and B by weight of said solution and from about 0.0005% up to .001% by weight of said solution of an antibiotic selected from the group consisting of chloro-tetracycline, chloramphenicol, penicillin and mixtures thereof.

2. An aqueous soaking composition having a pH of 7.5 to 8.5 for the soaking of furs and hides after skinning to prevent the growth of proteolytic bacteria causing sliminess and odors in the solution and on the hides so-treated, said aqueous composition containing as the essential antibacterial substance therein at least about 0.0005% and not more than about 0.01% by weight of said solution of actinomycin A and B with another antibiotic in a concentration of at least about 0.0005% and not more than 0.001%, of said solution, said other antibiotic selected from the group consisting of chlorotetracycline, chloramphenicol, penicillin and mixtures thereof.

3. A composition as claimed in claim 2 wherein said actinomycin is at a concentration of about 0.001% and admixed therewith in said soaking solution is chloramphenicol in an amount of about 0.005% by weight of said solution.

4. A composition as claimed in claim 2 wherein said actinomycin is at a concentration of about 0.001% and admixed therewith in said soaking solution is chloramphenicol in an amount of about 0.005% by weight of said solution and 0.005% by weight of chloro-tetracycline.

5. A composition as claimed in claim 2 wherein said actinomycin is at a concentration of about 0.001% and admixed therewith in said soaking solution is chlorotetracycline in an amount of about 0.005% by weight of said solution.

6. A composition as claimed in claim 2 wherein said actinomycin is at a concentration of about 0.001% and admixed therewith in said soaking solution is chloramphenicol in an amount of about 0.005% by weight of said solution and 0.005% by weight of penicillin.

References Cited in the file of this patent

UNITED STATES PATENTS

| | | |
|---|---|---|
| 2,025,984 | Harris | Dec. 31, 1935 |
| 2,378,449 | Tishler | June 19, 1945 |
| 2,378,876 | Waksman | June 19, 1945 |
| 2,483,871 | Bartz | Oct. 4, 1949 |
| 2,584,166 | Stevenson et al. | Feb. 5, 1952 |
| 2,611,731 | Rawlins et al. | Sept. 23, 1952 |
| 2,680,701 | Cusumano | June 8, 1954 |
| 2,805,975 | Hamilton | Sept. 10, 1957 |

OTHER REFERENCES

Fulton et al.: Abstract in J.A.L.C.A., February 1945, pages 88 and 89.

Anderson et al.: Article in Journal Invest. Dermatology, January 1947, pages 25 to 33.

Spicer: Article in J. Lab. and Clin. Med., volume 36, number 2, pages 183 to 191, August 1950.

Squibb: Abstracts Bulletin, volume 24, number 2, pages A–23, A–274.

Progress in Leather Science, 1920–1945, London, 1948, pp. 108–110.

Lesser: Drug and Cosm. Ind., May 1945, vol. 56, No. 5, pp. 576, 577, 660, 661, 662, 663, 664, 665 and 666.

Harry: Cosmetic Materials, vol. II, 1950, London, pp. 224–229.

"Streptomycin," Waksman, 1949, Williams and Wilkins Co., Baltimore, pp. 561, 564 and 565.